3,326,973
RECOVERY OF AROMATIC CARBOXYLIC ACIDS FROM SOLVENT EXTRACTS
Louis A. Joo, Johnson City, Tenn., assignor, by mesne assignments, to Union Oil Company of California, Los Angeles, Calif., a corporation of California
No Drawing. Filed Feb. 18, 1963, Ser. No. 259,357
6 Claims. (Cl. 260—515)

This invention relates to a process for the recovery of high molecular weight water-soluble acids from the complex mixed mono-, di-, and polycarboxylic acid mixture produced by the metalation, carbonation and acidification of sulfur-containing aromatic compounds of petroleum origin, and to the products so produced.

This invention is based on the discovery that in the processing and purification of the complex acid mixtures resulting from the metalation, carbonation and acidification of complex sulfur-containing aromatic compounds of petroleum origin, as described in copending application Ser. No. 79,661 now U.S. Patent No. 3,153,087, filed Dec. 30, 1960, by W. E. Kramer, L. A. Joo and R. M. Haines, there is produced a water solution, which previously was discarded, containing valuable complex carboxylic acids. In said copending application the starting material, such as solvent extracts obtained in the solvent extraction of mineral lubricating oils using a solvent selective for aromatic compounds, is treated with an alkali metal in a dispersion zone at a temperature of about 130° to 190° C. The resulting dispersion is treated with a reaction solvent and the temperature is allowed to subside to about 0° to 40° C., during this addition. Adduct-formation takes place and the product is cooled to about —75° to —50° C. and passed to a carbonation zone into contact with solid or gaseous carbon dioxide. The carbonated mixture is then passed to a flash zone where the temperature is allowed to reach ambient conditions to release excess carbon dioxide. The reaction solvent is removed by vacuum flashing to produce a solid residue comprising unreacted alkali metal and aromatic hydrocarbon in combination with the alkali metal salts of mixed complex mono-, di-, and polycarboxylic acids derived from said solvent extracts and small amounts of by-product.

In order to separate relatively pure carboxylic acids or their salts from this reaction mixture, having utilities in compositions or in the preparation of polyester, polyamides, etc., of enhanced value, the reaction mixture is taken up in a suitable solvent and the excess alkali metal is destroyed by the addition of water or through other processes known in the art. In using water to destroy the alkali metal, slow addition thereof is practiced and the released hydrogen recovered. Alternately the unreacted alkali metal is separated by centrifuging or filtering, and recycled to the metalation reaction.

The solution of product residue resulting from the use of water to destroy the unreacted alkali metal or the residue left from centrifuging, either being free of said unreacted alkali metal, is mixed with a sufficient quantity of a mineral acid to reduce the pH to a value of about 7 to 9, with or without the addition of water or more solvent, depending on the consistency of the solution or product at this point. Acidification prevents emulsification difficulties in subsequent processing. Any hydrogen sulfide that is liberated during acidification is separated and withdrawn.

The reaction mixture is next treated with a solvent and separated into two phases, (1) a lower aqueous phase containing primarily the desired complex acids in the form of alkali metal salts, and (2) an upper solvent phase containing primarily unreacted oil and other by-products. The upper solvent phase (2) is water-washed to form a second aqueous extract phase and a second solvent phase. The lower aqueous phase (1) is washed with a solvent to form a (5) second (lower) aqueous phase containing complex acid salts, and a (6) second (upper) solvent phase.

The second solvent phases (4) and (6) from these steps are combined and passed to a contact vessel where additional water is added to extract as an aqueous phase (7) any remaining water-soluble salts and form a raffinate or solvent phase (8) which is distilled to separate the solvent for recycle and produce a bottoms comprising unreacted aromatics. The lower aqueous phases (3), (5) and (7) are combined, additional solvent is added when necessary, and the mixture is acidified. This operation results in the release of considerable amounts of carbon dioxide, which is recycled in the process, and a liquid aqueous mixture of products. The product layer is contacted further with solvent selective for the complex acids to cause the separation of a (9) solvent phase containing a predominance of the desired complex acids from any remaining water along with some of the complex acids and a (10) water phase, which is further contacted with a solvent selective for the complex acids to form a (11) final water phase, which heretofore was discarded and a final (12) solvent phase containing any remaining quantities of the desired complex acids. The solvent phase (12) is combined with solvent phase (9) and distilled to recover the solvent as overhead and a bottoms of relatively pure complex acids.

In accordance with this invention the discarded water phase (11) has been found to contain valuable water-soluble complex carboxylic acids, and same are recovered by a particular sequence of steps namely (a) neutralizing the water solution of water-soluble complex acids, (b) concentrating the neutralized water solution into a slurry form, (c) acidifying the concentrated slurry, (d) subjecting the acidified, concentrated slurry to extraction with an ether or ketone solvent and (e) distilling the solvent phase to recover the solvent as overhead and the water-soluble complex acids as bottoms or as an alternate procedure the desired water soluble acids are found to be recoverable by, (f) neutralizing the water solution of water-soluble complex acids with a Group II metal oxide or hydroxide, to form a water-insoluble salt (g) filtering, washing and drying the precipitated salts of the complex acids.

(h) suspending the precipitated salts in an anhydrous solvent.

(i) treating the anhydrous solvent with dry acid anhydride gas such as HCl, SO$_3$, etc., (j) separating the resulting inorganic solid phase from the organic liquid phase and (k) distilling the solvent from the organic liquid phase to form the desired complex acids as bottoms and recover the anhydrous solvent for recycle to step (h).

Accordingly this invention is based on the discovery that a small portion of unique water-soluble complex mixed carboxylic acids are produced through the metalation, carbonation and acidification of a source of complex aromatic, heterocyclic condensed ring nuclei as exemplified by solvent extracts. The recovery of this fraction from the water phase cannot be accomplished by simple extraction with an organic solvent since these complex acids are preferentially soluble in water even in the presence of organic solvents, such as ethers and ketones having high solubilities for aromatic compounds of this nature. Also these water-soluble complex acids are highly desirable for the preparation of resins and plastics because they contain on the average twice as many carboxyl groups per molecule as the main product separated by extraction methods. Although the concentration of these water-soluble acids in the final water phases is relatively low, being in the order of about 4 to 6 g. per liter of water, their recovery is justified because of their unusual properties.

The carbon-hydrogen analyses and the molecular weight determinations of a number of laboratory and pilot plant runs of the metalation, carbonation, acidification and recovery steps, show that these preferentially water-soluble complex acids have from 16 to 22 carbon atoms, acid numbers (1948 method) in the order of 350 to 480 and a H/C ratio of about 1.0 to 1.1, indicating that they have predominantly aromatic nuclei. In contradistinction to this the bulk of the complex acids recovered from the solvent phases (a) and (12) has the following relatively uniform carboxyl group distribution.

TABLE I

| Cut No. | Formula | A.N. | Mol. Wt. | —COOH,mole |
|---|---|---|---|---|
| Charge | $C_{18}H_{20}O_{6.4}$ | 419 | 335 | 3.5 |
| 1 | $C_{21}H_{22}O_{7.5}$ | 423 | 390 | 2.9 |
| 2 | $C_{20}H_{21}O_7$ | 422 | 380 | 2.9 |
| 3 | $C_{22}H_{22}O_7$ | 414 | 400 | 2.9 |
| 4 | $C_{20}H_{21}O_{6.9}$ | 427 | 375 | 2.9 |
| 5 | $C_{20}H_{21}O_{6.3}$ | 391 | 360 | 2.5 |
| 6 | $C_{16}H_{17}O_{5.1}$ | 345 | 290 | 1.8 | the charge acids being prepared and separated in accordance with copending application Ser. No. 209,741 now abandoned, filed July 13, 1962.

It becomes therefore a primary object of this invention to provide complex high molecular weight carboxylic acids derived from sulfur-containing aromatic compounds of petroleum origin, which acids are characterized by being preferentially water soluble, contain about 2 to 5 or more carboxyl groups per molecule, have 16 to 22 carbon atoms per molecule, and acid numbers from about 350 to 480, and are predominantly aromatic in nature.

Another object of this invention is to provide complex high molecular weight carboxylic acids derived from solvent extracts, obtained in the solvent extraction of mineral lubricating oils using a solvent selective for aromatic compounds, by metalation, carbonation, and acidification, which acids are characterized by being preferentially water soluble, contain about 2 to 5 or more carboxyl groups per molecule, have 16 to 22 carbon atoms per molecule, acid numbers from about 350 to 480, and are predominantly aromatic in nature.

A still further object of this invention is to provide a method for separating the preferentially water-soluble, predominantly aromatic carboxylic acids of high acid number and containing about 3 to 7 carboxyl groups per molecule from the water phase resulting from the selective solvent treatment of the acidified reaction products of the metalation and carbonation reactions.

These and further objects of this invention will be described or become apparent as the specification proceeds.

Because of the complexity of the subject matter herein and the fact that several copending applications by the instant inventor and others have been filed, or are under preparation, which make a full disclosure of the general characteristics of the main body of acids produced and separated from the non-aqueous phase, the starting materials, the conditions of metalation, carbonation, acidification and purification from which a final aqueous phase is produced, having the desired highly characteristic complex acids to be separated in accordance with this invention, wherever possible such prior disclosures will be incorporated by reference to the related applications. Accordingly the description of this invention will be developed by setting forth the starting materials, the processes by which the acid mixtures are prepared from which the preferentially water-soluble phase (or phases) is or are separated, several illustrative examples thereof, examples illustrating the present invention and examples illustrating the manner of using the unusual acids of this invention.

THE STARTING MATERIALS

The starting material for the reaction to prepare the initial complex acid mixture may be any complex, polynuclear, and/or heterocyclic sulfur-containing aromatic hydrocarbon of petroleum source. A preferred and unique source of aromatic starting material comprises petroleum fractions of the group consisting of (1) solvent extracts obtained in the solvent refining of mineral lubricating oils using a solvent selective for aromatic compounds, (2) mildly hydrogenated solvent extracts, (3) FCC recycle, stock, (4) decant oils from FCC processes and (5) mixtures of these starting materials.

Illustrating the preferred starting material is the class known as solvent extracts from the manufacture of mineral lubricating oils, which solvent extracts are rich in complex, polynuclear, aryl, alkaryl, condensed ring and heterocyclic nuclei forming the organic portion of the initial mono-, di-, and polybasic carboxylic acid mixture as a result of the initial metalation, carbonation and acidification reactions of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex aromatic hydrocarbon starting materials comprises solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined; by treatment with said selective solvent having an affinity for the aromatic compounds.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the initial complex acid mixture from which the acids characterized by this invention are separated.

TABLE II.—SOURCES AND PHYSICAL CHARACTERISTICS OF SOLVENT EXTRACTS

| Ext. No. | Crude Source | Solvent | API Grav. | Sp. Gr. at 10° F. | Vis/100° F. | Vis/130° F. | Vis/210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | ...do | ...do | 15.4 | | 15,000 | | 285 | +39 | | | | | | |
| 3 | ...do | ...do | 12.6 | | 36,410 | 4,310 | 310.1 | −1 | +80 | | | | 4.7 | 2.27 |
| 4 | ...do | ...do | 14.6 | | 19,500 | 4,305 | 313 | +27 | +90 | | | | 4.7 | 2.2 |
| 5 | ...do | ...do | 15.4 | | 32,500 | | 372 | +5 | +60 | | | | 4.13 | 2.33 |
| 6 | ...do | ...do | 13.7 | | 25,000 | 5,400 | 355 | +27 | +80 | | | | | 2.18 |
| 7 | ...do | ...do | 8.6 | | 145,000 | 19,000 | 616 | 0 | +70 | | | | | |
| 8 | ...do | ...do | 10.5 | | 12,676 | 2,514 | 172.1 | −101 | +60 | | | | | 2.18 |
| 9 | Santa Fe Springs. | ...do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene. | 10.0 | 1.000 | | | 1,500 | | +75 | 555 | 640 | 60 | | |
| 13 | Mid-Cont | Propanecresol. | 14.4 | 0.9699 | | | 1,500 | | +100 | 540 | 605 | 63.7 | | |
| 14 | ...do | Phenol | 13.6 | | | | 41.7 | −82 | +20 | | | | | |
| 15 | ...do | Chlorex | 13.6 | | | | 200 | −61 | +75 | | | | | |
| 16 | ...do | Phenol | 8.9 | | | | 569 | | +75 | | | | | |
| 17 | ...do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | ...do | ...do | 11.1 | | | | 61.5 | −56 | +40 | 435 | 475 | | 0.42 | 2.7 |
| 20 | ...do | ...do | 13.7 | | | | 360 | +25 | +65 | 550 | 630 | | 5.5 | 2.3 |
| 21 | ...do | ...do | 7.7 | | | | 71.1 | −128 | +35 | 420 | 495 | | 0.86 | 3.2 |
| 22 | ...do | ...do | 7.3 | | | | 796 | −76 | +65 | 520 | 610 | | 7.7 | 3.0 |
| 41 | ...do | ...do | 17.6 | | 154 | 80 | 41 | 11 | +30 | 400 | 435 | | 0.1 | 2.0 |
| 42 | ...do | ...do | 13.7 | | 26,000 | 5,615 | 360 | +25 | +65 | 550 | 630 | 37.5 | 5.5 | 2.3 |
| 43 | ...do | ...do | 11.1 | | 1,054 | 331 | 61.5 | −56 | +40 | 435 | 475 | 40.0 | 0.4 | 2.7 |
| 44 | ...do | ...do | 7.7 | | 2,007 | 611 | 71.1 | −128 | +35 | 420 | 495 | 38.6 | 0.86 | 3.2 |
| 45 | ...do | ...do | 7.3 | 1.019 | 230,000 | 20,800 | 796 | −76 | +65 | 520 | 610 | | 7.7 | 3.0 |

Extract No. 41 was obtained in the production of 85 Vis neutral, has an average molecular weight of 300, and contained 76.8% aromatics (by the silica gel procedure).

Extract No. 42 was obtained in the production of 150 Vis Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis neutral, has an average molecular weight of 340, contained 87.0% aromatics, 13% saturates, analyzed 86.4% carbon, 10.7% hydrogen, and averaged 2.7 aromatic rings per aromatic molecule.

Extract No. 44 was obtained in the production of 200 Vis neutral, has an average molecular weight of 340 and contained 87% aromatics and 13% saturates.

Extract No. 45 was obtained in the production of 160 Vis Bright Stock and contained 92% aromatics and 8% saturates.

The solvent extracts from lubricating oils used as starting materials have the following general properties and characteristics:

TABLE III

| Characteristic: | Range of value |
|---|---|
| Gravity, ° API | 7.3–18.3 |
| Gravity, Sp., 60/60° F. | 0.945–1.022 |
| Viscosity SUS @ 210° F. | 40–1500 |
| Viscosity index | −128–+39 |
| Pour point (max) ° F. | +35–+100 |
| Molecular weight, average (above 300) | 320–750 |
| Boiling point (initial) °F. | 300–1000 |
| Boiling point (end) ° F. | 400–1200 |
| Sulfur, percent wt. (total) | 0.5–4.5 |
| Sulfur compounds percent by vol. | 20–50 |
| Aromatic compounds | 25–90 |
| Neutral aromatic hydrocarbons | 40–51 |
| Av. No. of rings/mean arom. mol. | 1.7–5.0 |

The complexity of the types of compounds present, as based on these analyses, is illustrated by the following table:

TABLE IV.—ESTIMATED CHEMICAL COMPOSITION OF SOLVENT EXTRACTS NOS. 19, 21, 43 AND 44 OF TABLE II

| Type of compound: | Approx. percent in the extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 00.5 |
|   Substituted benzphenanthrenes | 0.2 |
|   Substituted pyrenes | 0.2 |
| Pentanuclear aromatics: | |
|   Perylene | 0.01 |
| Sulfur compounds,[1] oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated, prior to use in preparing the initial complex carboxylic acid mixture from which the selected characteristic fraction or fractions of this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of about +5° F. and results in the removal of about 2% wax having a melting point of about 130° F. Clay-contacting can be accomplished by known methods.

The preparation of hydrogenated extracts is accomplished using known methods of mild hydrogenation. Thus a preferred method of preparing hydrogenated extracts is to hydrogenate the distillate lube oil or residual oil before the extraction by treatment with hydrogen at 100–50 p.s.i.g. using temperatures of 530–600° F. in the presence of a molybdena-silica-alumina catalyst. This same method can be applied to the solvent extracts per se, that is after the separation from the raffinate.

Mild hydrogenation results in the decarboxylation of any naphthenic acids present, slight reduction in olefin content as indicated by reduction in bromine number, without affecting the aromaticity, and the production of an extract from which complex acids of enhanced properties can be obtained by metalation, carbonation, acidification and treatment in accordance with this invention.

Other known methods of hydrogenation can be applied to the solvent extracts using such catalysts as filtrol, cobalt-molybdate, silver-molybdate and Porocel. The characteristics of a representative hydrogenated dewaxed and clay-contacted solvent extract are ° AFI, 9.5; color, NPA, 7; Flash (COC), 420=F.; Fire (COC), 465° F.; Pour Point, 05° F.; Vis. @ 100° F., 1075 SUS; Vis. @ 210° F., 58.5 SUS; VI, −96; Neut. No. (1948), 0.05; Sulfur, 2.60 wt. percent and CR percent, 0.01.

The results of mild hydrogenation or hydrotreating several of the solvent extracts shown in Table II to produce hydrogenated solvent extract starting materials, or dewaxed and hydrogenated solvent extract starting materials are shown in copending applications Ser. Nos. 248,209, filed Dec. 31, 1962 and 248,234, filed Dec. 31, 1962, among others. Also the preparation and properties of FCC recycle stock and decant oil from FCC processes are shown in said copending applications supra and in applications Ser. Nos. 248,209, filed Dec. 31, 1962; 242,076, filed Dec. 4, 1962 and 247,515, now U.S. Patent No. 3,271,353, filed Dec. 27, 1962.

The FCC recycle stock is illustrated by the 19% extract (phenol solvent) of FCC recycle stock, which extract had the following properties: ° API, 1.8; sulfur, 1.9 wt. percent; Br. No., 17; RI (20° C.) 1.6372 and Engler Distillation, −IBP=589° F.; 90%−745° F.

A typical FCC decant oil is one having an API gravity of 15.4°, IBP 375° F. and EP 995° F. at atmospheric pressure, CS vis. @ 100° F. 21.00, CS vis. @ 210° F. 3.66, percent S 0.870, Ramsbottom C 1.07, mol. wt. 320, Vis. Gr. Con. .945, Br. No. 8.0. The 47 vol. percent extract from this decant oil has a specific gravity of 1.095, exhibts the same initial boiling point and end boiling point and has the following characteristics: CS vis. @ 100° F. 223.5, CS vis. @ 210° F. 7.80, percent S 1.44, Ramsbottom C 5.7, Vis. Gr. Con. 1.103, Br. No. 14.0, which is another species of the starting material.

The use of these latter starting materials is described in copending application Ser. No. 79,661 now U.S. Patent No. 3,153,087.

*The initial complex carboxylic acid mixture*

The initial complex carboxylic acid mixtures used in accordance with this invention are prepared in accordance with the processes disclosed in copending application Ser. No. 819,932, now abandoned, filed June 12, 1959 by T. W. Martinek (abandoned and refiled Aug. 1, 1962 as continuation-in-part, Ser. No. 220,334 now U.S. Patent No. 3,133,399), Ser. No. 79,661, filed Dec. 30, 1960 by Messrs. W. E. Kramer, L. A. Joo and R. W. Haines, and Ser. No. 160,882, now U.S. Patent No. 3,222,137 filed Dec. 20, 1960 by T. W. Martinek.

These acid mixtures are further described in related copending application, Ser. No. 79,541, now U.S. Patent No. 3,154,507 filed Dec. 30, 1960 by Messrs. W. E. Kramer and L. A. Joo, and Ser. No. 79,506, now abandoned filed Dec. 30, 1960 by Thomas W. Martinek.

In accordance with said copending applications the complex, polynuclear, aromatic, and alkaromatic carboxylic acid mixtures are derived by metalation, carbonation, and acidification of a source of complex, polynuclear, aromatic sulfur-containing nuclei as represented by the starting materials just described.

The resulting complex acids, hereinafter referred to as extract acids, or EPA, are mixtures of mono-, di-, and polycarboxylic acids and representative formulae are shown in said copending applications. Through chemical analysis, characterization and study of the physical and chemical properties, by way of illustration only, the complex acids separated from the final water phase can be represented by the following formulae:

Dibasic Acids

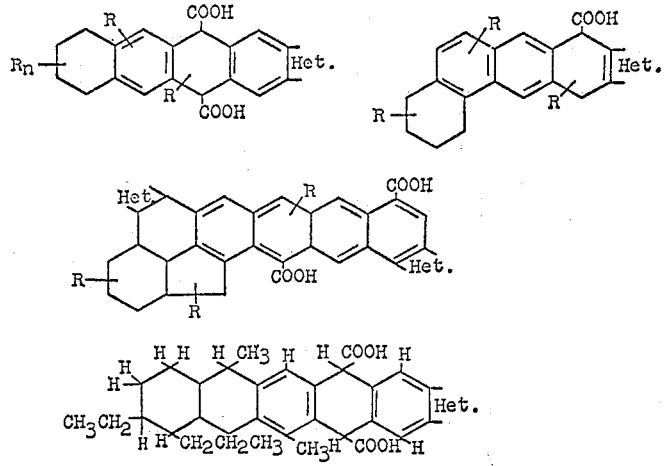

Tribasic Acids

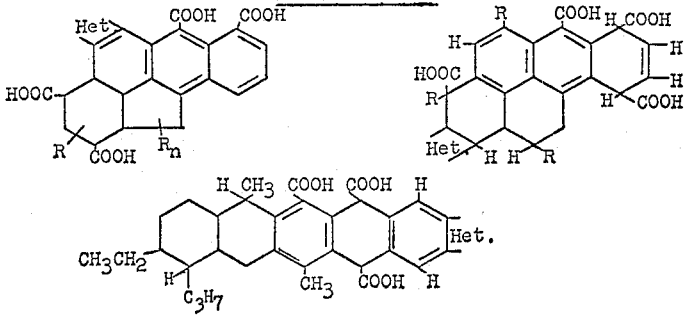

Tetrabasic Acids

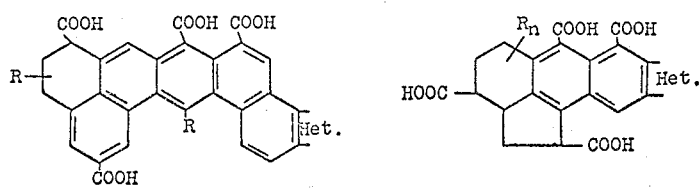

Wherein "Het." illustrates one or more S-, or O-containing heterocyclic ring substituents, R is an alkyl or cycloalkyl radical having a total of 5 to 22 carbon atoms for each nucleus and $n$ has a value of 3 to 10. The above representations are subject to variation, thus the tetrabasic acids may also be in the form of dibasic acids having two less carboxyl groups. The molecular weight of the water-soluble extract acids of this invention ranges from about 300 to 750, and the average molecular weight is about 325–475. Table V gives representative physical and chemical properties of the water-soluble polycarboxylic acids as characterized in accordance with this invention.

TABLE V

| Property: | Value |
|---|---|
| COOH/mole | 2.5. |
| Av. No. of aromatic rings per means aromatic molecule | 2.0–5.0. |
| Av. mol. wt. range | 325–475. |
| Melting point, °C. | 60–100. |
| Bromine No. | 4–24. |
| Percent sulfur | 1.0–4.5. |
| Color | Deep red-dark brown. |
| Percent unsaponifiables | 2–8. |
| Acid No. (1948 Method) | 350–480. |

In the mixture of acids produced by metalation, carbonation, and acidification of solvent extracts, the monobasic acid derivatives constitute from 5–95% by weight, the dibasic acids constitute from 5–95% by weight and the polybasic acids, that is, those acids containing from 3 to 5 and as high as 7 carboxyl groups, make up from a trace to 20% by weight. The water-soluble portion thereof separated in accordance with this invention may contain small proportions of monobasic acids, but is found to predominate in acids as described in Table V and particularly acids having 3 to 4 or an average of about 3.5 carboxyl groups per molecule.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about 60° to 80° C. in the presence of a reaction solvent such as dimethyl glycol ether, dimethyl ether, methylalkyl ethers, dialkyl glycol ethers, tetrahydrofuran, methylal, and trimethylamine. The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acid which, upon acidification with a mineral acid, such as sulfuric, nitric, or hydrochloric acids, yields the desired complex, polynuclear, carboxylic acids in good yields. To illustrate, the following non-limiting examples are given.

*Example I*

One hundred gms. of extract oil No. 19 (Table II) from the preparation of 170 vis., 100 VI neutral oil, dissolved in 675 cc. of dry tetrahydrofuran, was reacted with agitation at 10° to 30° C. with 8.3 gms. of metallic sodium in the form of $\frac{3}{16}''$ cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of a mixture of ether-soluble free acids and a water phase. About 11% of the solvent extract had reacted. The ether-soluble portion of the acid product (No. 1 of Table II) had an indicated average molecular weight of 686, a saponification value of 171, and a calculated equivalent weight of 328, indicating an average of 2.1 carboxyl groups per molecule. The water phase when treated to neutralization, concentration by boiling, acidification, ether extraction, and distillation of the extract phase results in the characteristic acids of this invention.

*Example II*

One hundred gms. of extract oil No. 19 (Table II) and 675 ml. of dry tetrahydrofuran were charged to a one-liter, 3-necked flask equipped with a stirrer, thermometer, pressure-equilized drop-funnel, gas inlet with rotometer, and gas outlet. A dry nitrogen atmosphere was maintained in the flask. Approximately 100 gms. of Alundum balls, $\frac{5}{16}''$ in diameter, were charged and agitation started. The solution was cooled to −20° C. and 8.3 gms. of sodium as a 20% dispersion in toluene were added. After an induction period of about 5 minutes, the solution was warmed, and at −7° C. the reaction began; in 17 minutes it was proceeding rapidly. An excess of dry carbon dioxide was added at −80° C. over a period of 78 minutes. The reaction mass was worked up as in Example I after the excess sodium was destroyed with water to separate a solvent phase and a water phase. Finishing of the solvent phase showed that about 15% of the extract oil reacted, and 22.5 gms. of mixed extract acids were recovered having a saponification value of 241, indicating an equivalent weight of 233. This mixed acid product contained 2.8% sulfur. The water phase on treatment in accordance with this invention produces the desired water soluble acids.

Example III

A 6,123 g. portion of Extract No. 44 was charged to a hacketed reaction vessel equipped with a mixer and a High Speed Dispersator, the oil was heated to 220° F., 508 g. of sodium were added, the mixture was heated to 317° F. and the Dispersator was turned on for four minutes. Then, the resulting sodium-in-oil dispersion was cooled to 80° F., 8 gallons of tetrahydrofuran were added, the resulting solution was cooled to −5° F., 1500 g. of Dry Ice were added, and the mixture was stirred. Next, the tetrahydrofuran was evaporated from the solution, the residue was cooled, 1.5 gallons of heptane and 3 gallons of water were added, the mixture was stirred thoroughly and allowed to settle into an oil phase and a water phase, and the phases were separated. The pH of the resulting water phase was reduced to 8.5 by adding concentrated hydrochloric acid and washed thoroughly with heptane, 4 gallons of a 3:1 mixture of toluene and ether were added, the pH was lowered to 1.0 by adding more concentrated hydrochloric acid, and the resulting oil and water phases were separated.

2800 ml. of the water phases was neutralized to pH 6-7. The water was stripped off under vacuum, the temperature never exceeded 55° C. The water was not boiled off completely and enough water was left to keep the NaCl and other salts in a form of a thick slurry. 50 ml. ether was added to the slurry and with conc. HCl the pH was brought to pH 1. After vigorous stirring the ether phase was separated from the water and with fresh ether each time (50 ml.) the extraction was repeated nine times. The ether phases were combined, the ether was stripped off and Cut #1 was obtained; 8.6 g. A.N. 476; Mol. Wt. 405.

The extracted NaCl slurry was dried, pulverized and in a Soxhlet extractor for 24 hours with ether (Cut #2) and subsequently with isopropanol (Cut #3). Solvents were evaporated and Cuts #2 and #3 were obtained. Cut #2: 3.4 g., A.N. 417. Cut #3: 1.8 g., A.N. 456.

In a subsequent run it was found that, if ether is replaced by methyl ethyl ketone, or methyl-isobutyl ketone, the ether and isopropanol extractions resulting in Cuts #2 and #3 can be omitted since the ketones are better solvents for these acids, and the extraction with these solvents is practically complete.

Example IV 2000 ml. of the water phase from Example III was extracted first with twice 500 ml. ether to obtain a clear water solution. This solution was neutralized with saturated $Ca(OH)_2$ water solution, it was warmed up to 70–80° C., kept at this temperature for 10 minutes and the precipitate was filtered, washed and dried. A slurry was prepared with the pulverized Ca-salt and MEK and dry HCl gas was bubbled through the slurry. After more than 150% of the calculated HCl was bubbled through, the calcium chloride was separated by filtration from the organic phase, the MEK was stripped off in vacuum, and 8.7 g. water-soluble complex acid was recovered, A.N. 487.

The process of this invention has been demonstrated by a number of non-limiting examples. The unique complex water-soluble acids thus produced have utility in the preparation of various derivatives such as transformation into salts for use as additives for lubricating oils to act as gelling agents, or as corrosion inhibitors for detergent compositions, DDT stabilizers, as initiators in polymerization reactions or the acids may be used in the formation of modified epoxy resins, to prepare monomeric esters, alkyd resins, aminoamides, cross-linked polyester resins, resins for use in paving compositions and the like. For these purposes the complex acids of this invention are employed in the same manner as the known polyfunctional acids are used in the prior art. The compositions so prepared are characterized and distinguished from the prior art compositions in that they contain complex nuclei derived from sulfur-containing aromatic compounds of petroleum origin.

The non-limiting examples have demonstrated the preferred mode of operation of the invention and one skilled in the art is aware of various modifications than can be made in the process. The neutralization step, wherein the water solution of the unique water-soluble acids is first treated, can be accomplished by using any of a broad class of basic compounds that will react with carboxylic acids. The pH of this water-solution is about 1 to 5 prior to neutralization and generally found to be at a pH of about 3.0. Any basic material that will react with the acids and bring the pH to a value of about 6–7 may be used provided the neutralization products are stable and do not require the application of precautions to accomplish the distillation steps without decomposition, which would add to the cost of treatment.

Preferably and for economic reasons the neutralizing agents used in the process of this invention are alkaline earth metal oxides or hydroxides or alkali metal oxides or hydroxides. Thus calcium hydroxide, lime, barium oxide, barium hydroxide, barium hydroxide octahydrate, strontium hydroxide, sodium hydroxide, potassium hydroxide, lithium hydroxide and cesium hydroxide can be used.

The concentrating step wherein the excessive amounts of water are removed has a two-fold purpose. The removal of a major portion of the water results in a reduction in the volume of materials being handled, and enough water is left to maintain the inorganic and organic salts present in a thick slurry form. Concentration is accomplished by the application of heat to distill off the water and any other volatiles. This step is aided by the use of a vacuum in the order of 500 mm. to 300 mm. of Hg. Under these conditions the mixture is reduced in volume until it is in viscous or semi-liquid form for convenience in the acidification step which adds more liquid to the mixture.

The acidification of the slurry mixture is for the purpose of springing the complex acids in a concentrated form in which they can be readily extracted from any remaining aqueous phase. This is accomplished by the addition of concentrated mineral acid i.e. hydrochloric and is used in relatively concentrated form, that is containing about 25% to 43% hydrogen chloride in aqueous solution. The addition of the acid brings the pH to about 1 to 3.

The step of subjecting the resulting acidified, concentrated slurry to solvent extraction is conducted by applying the known techniques. The solvent and slurry are thoroughly mixed and allowed to settle to form and extract (solvent) phase and a raffinate phase. The solvent can be added before, after or at the same time as the acid. Counter current solvent extraction as a continuous basis can be applied. The extraction is carried out at ambient temperature and the temperature may be as high as about 90° C.

The desired acids present in the slurry are generally soluble in low molecular weight ethers, ketones and alcohols such as diethyl ether, di-n-propyl ether, diisopropyl ether, methyl n-butyl ether, ethyl n-butyl ether, di-n-butyl ether and di-n-amyl ether, that is alkyl ethers having from 4 to 10 carbon atoms; alkyl ketones having a total of 3 to 11 carbon atoms such as acetone, methyl ethyl ketone, methyl n-propyl ketone, diethyl ketone, hexanone-2, hexanone-3, methyl t-butyl ketone, di-n-propyl ketone, diisopropyl ketone, diisobutyl ketone and di-n-amyl ketone; and alkyl alcohols having 1 to 10 carbon atoms including methyl alcohol, ethyl alcohol, n-propyl alcohol, isopropyl alcohol, n-butyl alcohol, isobutyl alcohol, sec.-butyl alcohol, tert-butyl alcohol n-amyl alcohol, isoamyl alcohol, tert-amyl acohol, n-hexyl alcohol, cyclohexanol, n-octyl alcohol, and n-decyl alcohol.

One feature of this invention is based on the discovery that the use of a ketone sovent such as methylisobutyl ketone or methyl ethyl ketone during the extraction recovers the preferentially water soluble complex acids of high acid number of this invention by direct extraction of the neutralized water phase without the necessity of further extraction of the extracted slurry. In this modification all of the desired acids are recovered as Cut No. 1 of Example III.

In the alternate procedure for separating the unique water-soluble complex acids of this invention the water solution of the overall complex acids produced as a result of metalation, carbonation and acidification, followed by the herein described solvent extractions (to produce the heretofore discarded water-phase) is neutralizded with a Group II metal oxide or hydroxide, such as barium, calcium strontium, magnesium or cadmium oxide or hydroxide, as illustrated by lime, barium oxide, barium hydroxide octahydrate, calcium hydroxide and the like. The neutralization reaction is carried out by using any of the known techniques for such a reaction such as adding the oxide or hydroxide in dry form to the aqueous solution of acids, or by adding the neutralizer in aqueous solution or suspension. At least a stoichiometric amount and preferably an excess of the neutralizer is used and saturated aqueous solutions are preferred to prevent the build up of excessive amounts of water in the reaction mixture.

The addition of the neutralizer forms a precipitate of the desired acids in salt form. The reaction is aided by the application of heat, in which case temperatures of form about 50° to 150° C. may be used, although it is generally not necessary to heat the mixture over the boiling point of water, thus avoiding the necessity of the application of pressure. This reaction is completed within 5 to 30 minutes.

The precipitated salts are filtered, water-washed and may be dried or used in wet form for the next step. The precipitated salts are suspended in a suitable solvent (as previously described), such as a ketone or ester or alcohol of low molecular weight as illustrated by methyl ethyl ketone, diethyl ketone, di-propyl ketone, ethyl alcohol, propyl alcohol, methyl acetate, etheyl acetate and the like. The resulting slurry or suspension is treated with a substantially anhydrous (containing no more than about 5% of water) acidic gas, such as HCl, HBr, $SO_3$ and the like, or concentrated sulfuric acid or phosphoric acid may be used. For economical reasons HCl gas is preferred. About 110% to 160% of the calculated amount of acidic gas or other acid is used.

Treatment with the acidic gas or with slufuric acid results in the precipitation of the corresponding metal salt from the solvent solution or suspension and leaves the desired complex acids in the solvent phase. The solvent is removed by distillation to produce the preferentially water-soluble acids of this invention.

The embodiments of this invention in which an exclusive property or privilege is claimed are defined as follows:

1. In the process of preparing mixed complex high molecular weight aromatic carboxylic acids by treatment of a sulfur-containing aromatic compound of petroleum origin with an alkali metal to form the alkali metal adduct, carbonation of said adduct to form the alkali metal salt of the corresponding carboxylic acids, acidification of said salts to form the complex free acids and extraction of said free acids from the unreacted aromatic compounds by partition between an organic solvent and water, wherein a fraction predominating in water-insoluble complex carboxylic acids is recovered, the improvement comprising neutralizing and heating said water phase to precipitate the salt of said complex acids, separating the precipitated salts, suspending the precipitated salts in an organic solvent selected from the group consisting of: alkyl ethers having from 4 to 10 carbon atoms; alkyl ketones having from 3 to 11 carbon atoms; and alkyl alcohols having from 1 to 10 carbon atoms, treating said suspension with a mineral acid to form the mineral acid salt and separating the precipitated salt from the free complex acids.

2. The process in accordance with claim 1 in which said organic solvent is diethyl ether.

3. The process in accordance with claim 1 in which said organic solvent is a ketone selected from the group consisting of methyl ethyl ketone and methyl isobutyl ketone.

4. The process in accordance with claim 1 in which said preferentially water-soluble complex carboxylic acids are recovered from said aqueous phases by neutralization with a metal base to form water-insoluble salts thereof, separating said salts in said anhydrous organic solvent, treating the anhydrous solvent solution with a dry acid anhydride gas to form a separate solid inorganic phase and a liquid organic phase, and distilling said liquid organic phase to recover as bottoms the preferentially water-soluble complex carboxylic acids.

5. The process in accordance with claim 4 in which said metal base is a Group II metal base and said mineral acid is substantially anhydrous hydrogen chloride.

6. Preferentially water-soluble complex carboxylic acids produced by the process of claim 1 characterized by having acid numbers in the order of 350 to 480, H/C ratios in the order of 1.0 to 1.1, about 2 to 5 carboxyl groups per molecule and an average of about 3.0 to 5.0 aromatic rings per mean aromatic molecule.

References Cited

UNITED STATES PATENTS 3,153,087   10/1964   Kramer et al. _____ 260—515

LORRAINE A. WEINBERGER, *Primary Examiner.*

THOMAS L. GALLOWAY, JR., *Assistant Examiner.*